(12) United States Patent
Hong

(10) Patent No.: US 11,350,508 B2
(45) Date of Patent: May 31, 2022

(54) LOW-ALTITUDE, LOW-POWER INSTALLABLE SMART STREETLIGHT SYSTEM

(71) Applicant: TLE.INC, Suncheon-si (KR)

(72) Inventor: Yung Keun Hong, Suncheon-si (KR)

(73) Assignee: TLE.INC, Suncheon-si (KR)

( * ) Notice: Subject to any disclaimer, the term of this patent is extended or adjusted under 35 U.S.C. 154(b) by 9 days.

(21) Appl. No.: 16/959,203

(22) PCT Filed: Jan. 2, 2019

(86) PCT No.: PCT/KR2019/000009
§ 371 (c)(1),
(2) Date: Jun. 30, 2020

(87) PCT Pub. No.: WO2019/135587
PCT Pub. Date: Jul. 11, 2019

(65) Prior Publication Data
US 2020/0337141 A1    Oct. 22, 2020

(30) Foreign Application Priority Data

Jan. 3, 2018  (KR) .................. 10-2018-0000804

(51) Int. Cl.
*H05B 47/13*    (2020.01)
*H04W 4/80*    (2018.01)
(Continued)

(52) U.S. Cl.
CPC .............. *H05B 47/13* (2020.01); *F21S 8/085* (2013.01); *F21S 9/037* (2013.01); *H04W 4/80* (2018.02);
(Continued)

(58) Field of Classification Search
CPC ..... H05B 47/13; H05B 45/10; F21Y 2115/10; Y02D 30/70; Y02B 20/72; H04W 4/38;
(Continued)

(56) References Cited

U.S. PATENT DOCUMENTS 5,939,987 A * 8/1999 Cram ..................... G08G 1/095
340/573.2
9,558,663 B2 * 1/2017 Breed .................... G08G 1/162
(Continued)

*Primary Examiner* — Amy Cohen Johnson
*Assistant Examiner* — Jianzi Chen
(74) *Attorney, Agent, or Firm* — Lex IP Meister, PLLC

(57) ABSTRACT

In each of delineator streetlights of a low-altitude, low-power installable smart streetlight system, a lighting unit is formed on a roadside, and a reflection panel is formed on an opposite-side of a direction of traffic. A low-power Bluetooth antenna relays control signals between nearby the delineator streetlights, and an alert panel is equipped on the reflection panel. A first sensor detects vehicles on roads and outputs a detection signal, and second sensors detect a wild animal and output a detection signal. A control unit controls the lighting unit to turn on when a car detection signal is inputted from the sensor unit, successively transmits the control signal to nearby the delineator streetlights, controls the alert panel to flash when a wild animal detection signal is inputted from the sensor unit, and transmits a control signal of flashing the alert panel to nearby the delineator streetlights.

5 Claims, 6 Drawing Sheets

(51) Int. Cl.
*H05B 47/19* (2020.01)
*H05B 45/10* (2020.01)
*F21S 8/08* (2006.01)
*F21S 9/03* (2006.01)
*F21Y 115/10* (2016.01)

(52) U.S. Cl.
CPC .............. *H05B 45/10* (2020.01); *H05B 47/19* (2020.01); *F21Y 2115/10* (2016.08)

(58) Field of Classification Search
CPC .. H04W 4/40; F21V 23/0471; F21V 23/0442; F21W 2131/103
See application file for complete search history.

(56) References Cited

U.S. PATENT DOCUMENTS

| | | | |
|---|---|---|---|
| 2013/0027221 A1* | 1/2013 | Johnson | G08G 1/087 340/902 |
| 2014/0001961 A1* | 1/2014 | Anderson | H05B 47/16 315/153 |
| 2015/0264776 A1* | 9/2015 | Amarin | G06Q 10/0875 315/129 |
| 2016/0286629 A1* | 9/2016 | Chen | F21V 5/045 |
| 2021/0114514 A1* | 4/2021 | Karol | B60Q 5/006 |

* cited by examiner

[Fig. 1]
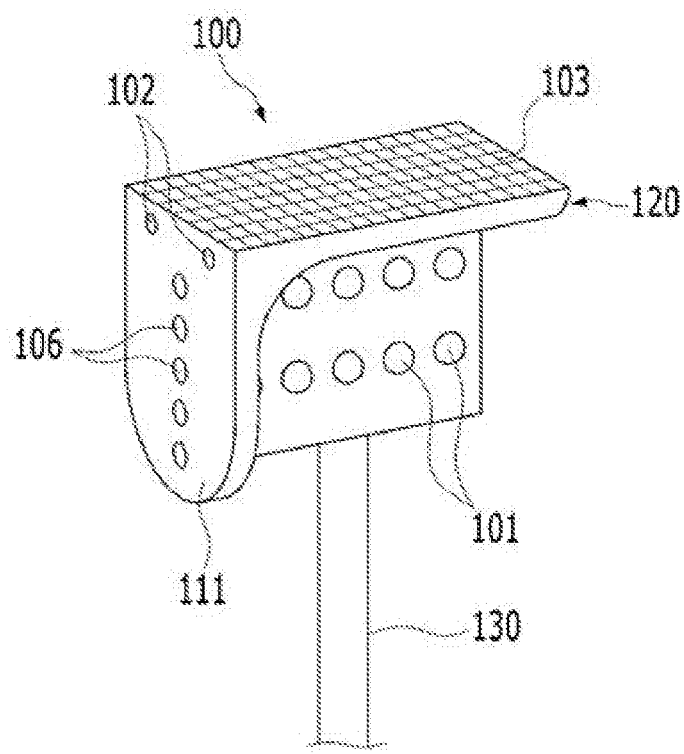

[Fig. 2]
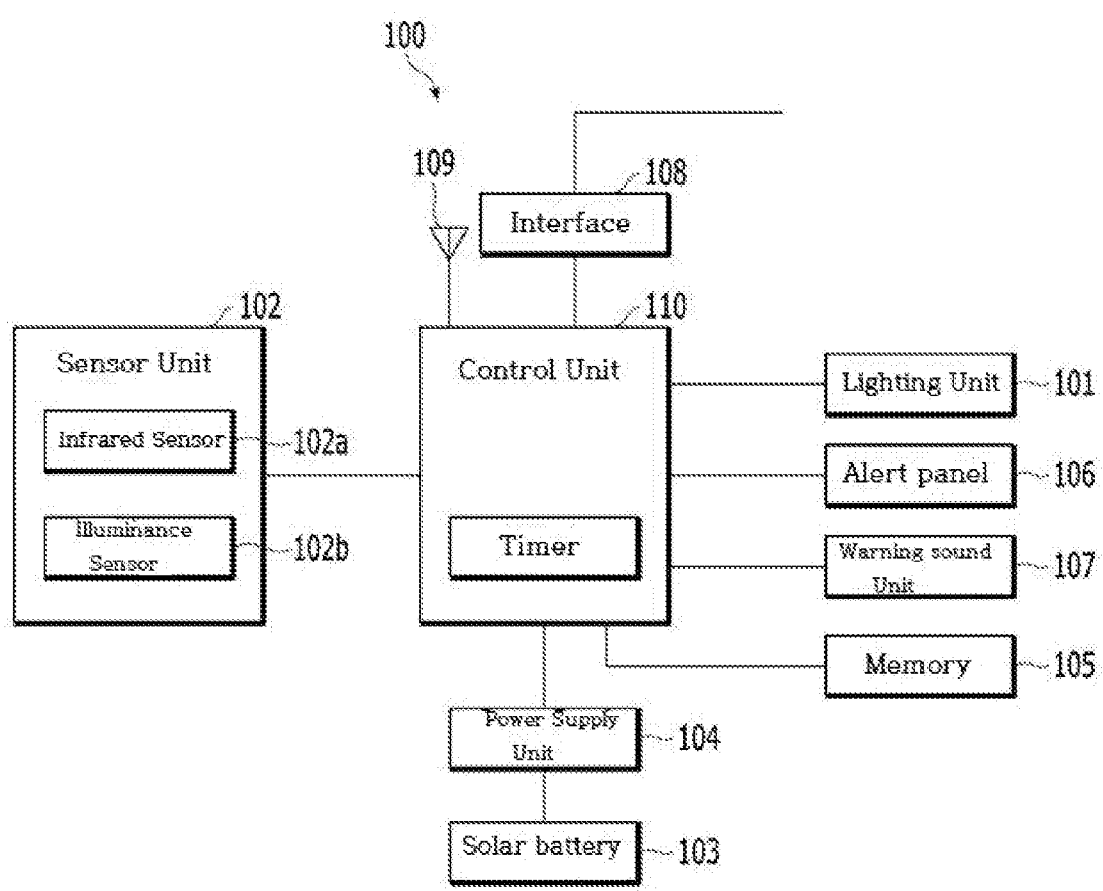

【Fig. 3】
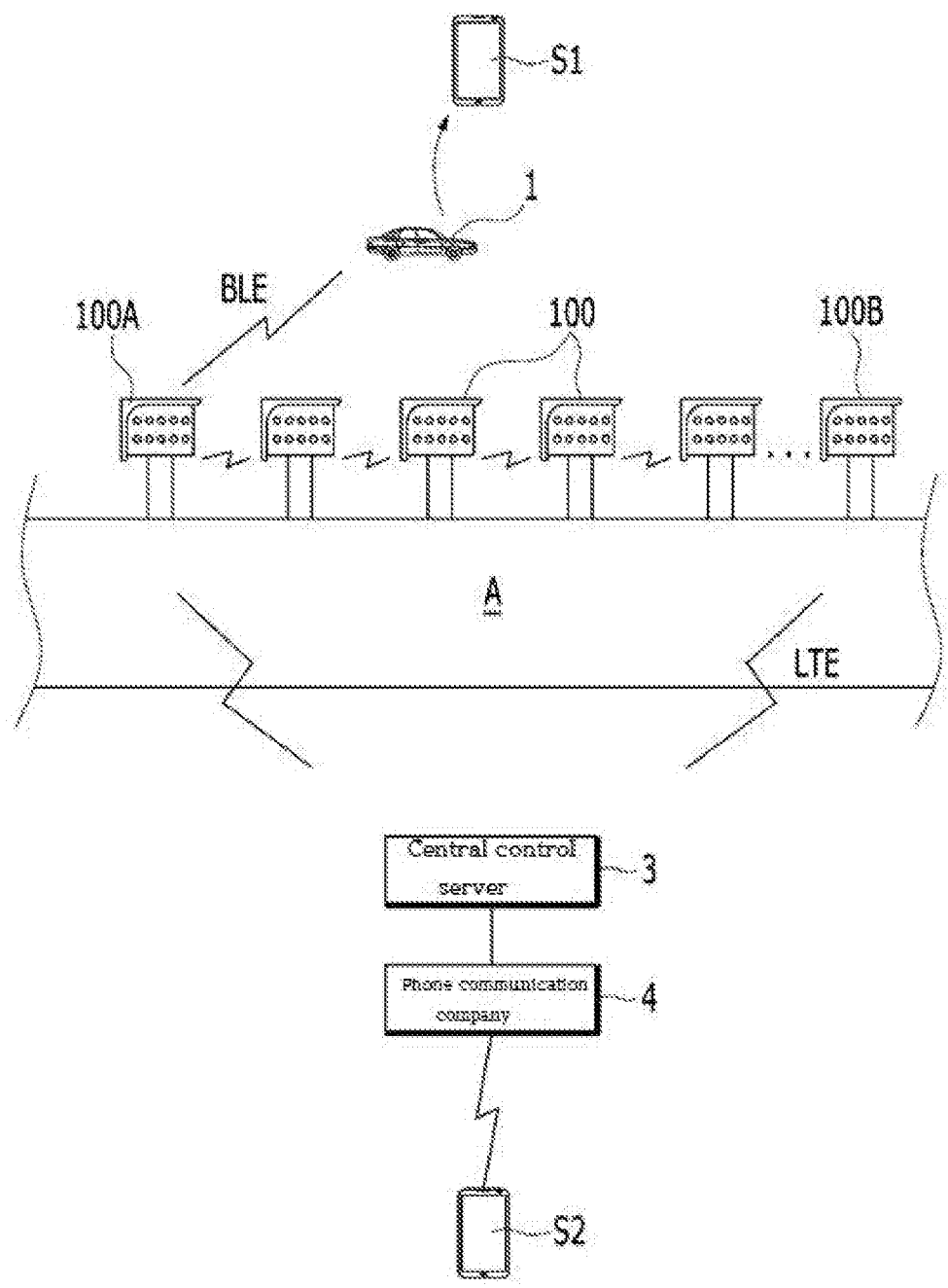

[Fig. 4]
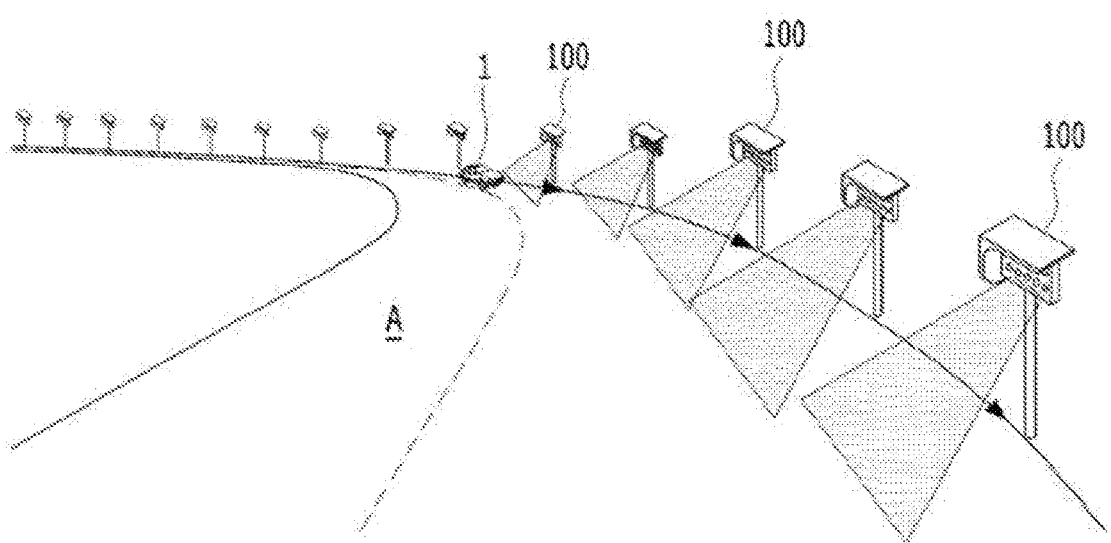

[Fig. 5]
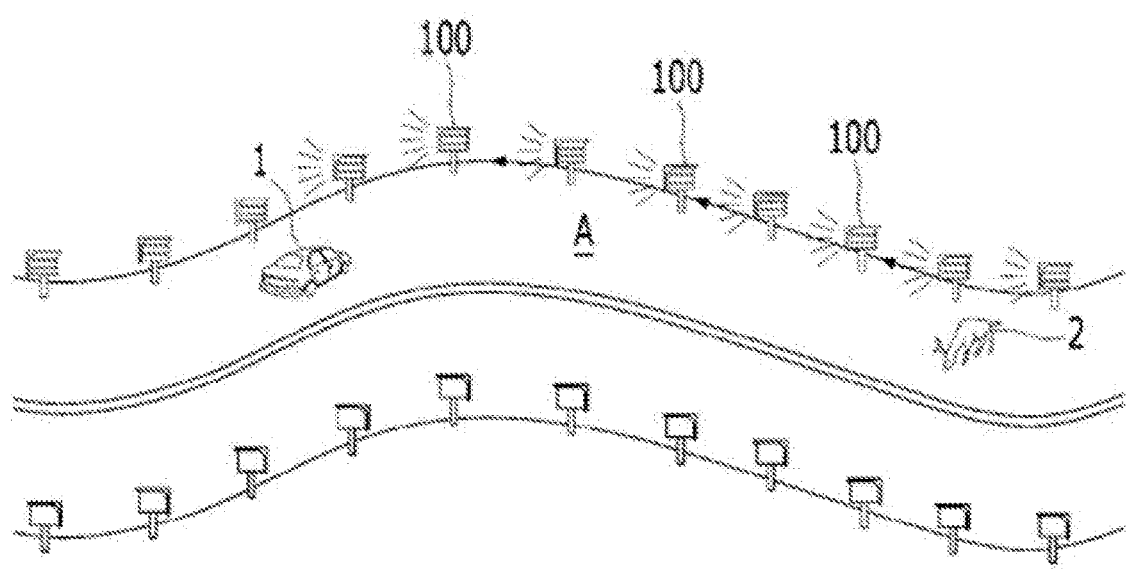

[Fig. 6]
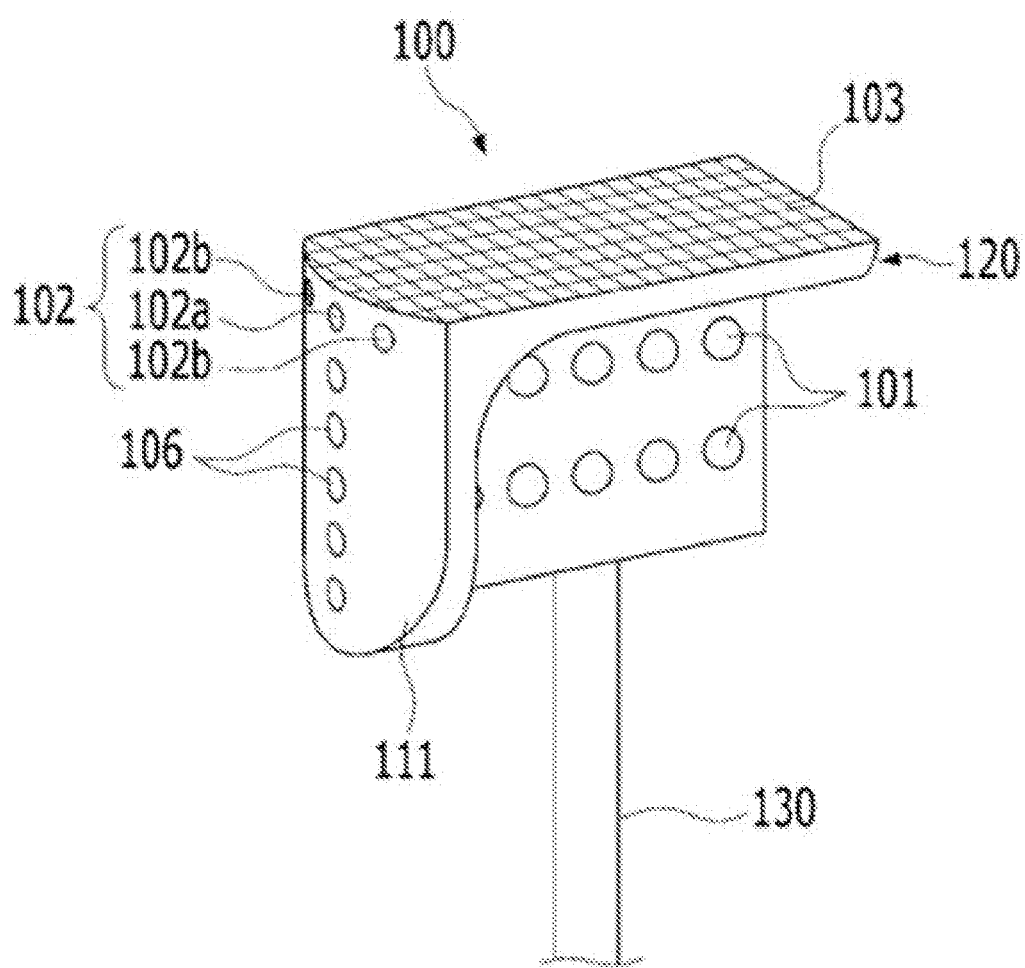

LOW-ALTITUDE, LOW-POWER INSTALLABLE SMART STREETLIGHT SYSTEM

TECHNICAL FIELD

The present invention relates to a low-altitude, low-power installable smart streetlight system thereby, more particularly, a system that allows safe driving by alerting drivers and that saves power consumption by successively switching on or flickering the delineator streetlights, which are installed in regular intervals at the same height as vehicles, in relay.

BACKGROUND ART

As streetlights are installed to illuminate light on sidewalks or roads and to allow better passing of pedestrians and cars, they generally consist of a pillar of a certain height and a luminaire installed on the pillar.

The luminaire includes a case, a light source installed inside the case, and a cover that transmits light emitted from the light source. The luminaire is composed of a sodium lamp, a mercury lamp, or etc. that uses high power as a light source. These days, it is being replaced by low-power streetlights that use LED.

However, since the prior streetlight is controlled to light up when the sun sets and light out when the sun rises, the prior art consisted a problem of consuming a lot of power as it maintained to illuminate at 100% brightness once it has been turned on.

Further, although a streetlight generally uses a sensor that detects the external brightness to automatically turn off the light in daytime, this streetlight also has a flaw of impracticality as the lamp maintains to be lit at night.

Generally, while guardrails are installed for the purpose of safe driving on the roads in city outskirts and mountainous areas and on highways, roadkill (roadkill: an accident involving an wild animal) occurs frequently on these roads as they are in close proximity of mountains or paddy fields that are suitable for habitation of wild animals (amphibians, mammals, reptiles, etc.

Although, to resolve this problem, the Ministry of Environment required the construction of eco-corridors by the road as an eco-friendly road when necessary and, in areas of frequent roadkill, alerted drivers via GPS system in addition to installed road signs to prevent accidents, the problem of frequent road kill still remains as these methods are passive that they cannot prevent roadkill by prohibiting the entry of wild animals on roads.

On the other hand, guardrails installed on curved roads, roads in construction, and other dangerous roads, and along the side of the road, boundary between roads and sidewalks, and center lines prevent vehicles from invading sidewalks or opposite traffic and falling out of the road.

These guardrails are supported by fixing the pillars that are installed in regular intervals, and they warn drivers about outer edges of roads and center lines by installing delineators that reflect the light shining from vehicles' headlights on the guardrails in regular intervals.

DISCLOSURE OF THE INVENTION

Technical Problem

The present invention has been made to solve above-stated problems. The present invention has a purpose of providing the low-altitude, low-power installable smart streetlight system that can significantly reduce the consumption power with delineator streetlights that successively turns on in relay after a delineator streetlight has detected a vehicle operating on road and that successively turns off in relay after the vehicle has passed.

Further, the present invention has another purpose of providing the low-altitude, low-power installable smart streetlight system that can prevent roadkill by alerting drivers about wild animals on road ahead with a delineator streetlight that detects nearby wild animals on and off the road and successive delineator streetlights behind that successively flash in relay.

SUMMARY OF THE INVENTION

In order to achieve above purposes, a low-altitude, low-power installable smart streetlight system comprises: a delineator streetlight that is installed in regular intervals at the same height as vehicles on medians or guardrails, that is formed in zones of grouped multiple each with unique IDs, and that is equipped with a lighting unit on the roadside and a reflection panel on the opposite-side of the direction of traffic; a low-power Bluetooth antenna, inside of the delineator streetlight, that relays control signals between nearby the delineator streetlights; a sensor unit, on the reflection panel, equipped with sensor 1 that detects vehicles on roads and outputs a detection signal and sensor 2 that detects wild animals and outputs a detection signal; a control unit that controls the lighting unit to turn on when a car detection signal is inputted from the sensor unit, that successively transmits the control signal for turning on the lighting unit to nearby the delineator streetlights using the low-power Bluetooth antenna, that controls an alert panel to flash when a wild animal detection signal is inputted from the sensor unit, and that transmits a control signal of flashing the alert panel to nearby the delineator streetlights using the low-power Bluetooth antenna; and an alert panel, equipped on the reflection panel, that is formed in an arrangement of multiple LEDs;

wherein the alert panel has the sensors 2 on each left-handed and right-handed side of the panel, which is protruded in the middle to have two slopped sides, to each detect wild animals on and off the road, and that has LEDs that distinguishes a caution LED and a warning LED with different colors, wherein the control panel flashes the warning LED when it decides that a wild animal has been detected on the road, transmits the control signal for flashing the warning LED on the alert panels to nearby delineator streetlights and the wild animal signal, flashes the caution LED when it decides that a wild animals has been detected nearby, off the road, and transmits the control signal for flashing the caution LED on the alert panels to nearby delineator streetlights.

The control panel transmits the control signal for turning on the lighting unit and the control signal for flashing the alert panel in different directions in relay.

The control panel transmits the wild animal detection signal via push notification to Smartphone 1 of a passenger in a car nearby the location where the wild animal has been detected when it decides that a wild animal has been detected on the road.

The low-altitude, low-power installable smart streetlight system further comprises an Internet of Things communication module that is equipped in the first delineator streetlight and the last delineator streetlight of the zone in the direction of traffic and that receives the control signal from delineator streetlights within the same zone and transmits the wild animal detection signal by Internet of Things communication with a central control server.

Advantageous Effects

According to the present invention, the low-altitude, low-power installable smart streetlight system can significantly reduce the consumption power with delineator streetlights that successively turns on in relay after a delineator streetlight has detected a vehicle operating on road and successively turns off in relay after the vehicle has passed.

Further, the low-altitude, low-power installable smart streetlight system can prevent roadkill by alerting drivers about wild animals on road ahead with a delineator streetlight that detects nearby wild animals on and off the road and successive delineator streetlights behind that successively flash in relay.

BRIEF DESCRIPTION OF THE FIGURES

FIG. 1 is an exemplary diagram of a delineator streetlight according to the present invention.

FIG. 2 is a block diagram of the delineator streetlight shown in FIG. 1.

FIG. 3 is a schematic diagram of the delineator streetlight system according to an embodiment of the present invention.

FIG. 4 is a drawing used for explaining the relay lighting of the delineator streetlight system according to an embodiment of the present invention.

FIG. 5 is a drawing used for explaining the relay flashing of the delineator streetlight system according to an embodiment of the present invention.

FIG. 6 is another exemplary diagram of a delineator streetlight of the present invention.

EMBODIMENTS

Hereinafter, preferred embodiments of the present invention will be described in detail with reference to the accompanying figures.

FIG. 1 is an exemplary diagram of a delineator streetlight that applies to the present invention.

As illustrated in FIG. 1, the left-handed traffic delineator streetlight (100) has a streetlight body (120) on an upper portion of a pillar (130) that has a certain height, a lighting unit (101) on the roadside of the streetlight body (120), a reflection panel (111) on the opposite-side in the direction of traffic, and a solar battery (103) on the upper side.

The reflector panel (111) serves as a shade to prevent the streetlight to shine on the driver and equips an alert panel (106) that is comprised of multiple LEDS and a sensor unit (102) that detects a car or a wild animal.

FIG. 2 is a block diagram of the delineator streetlight shown in FIG. 1.

As shown in FIG. 2, the delineator streetlight (100) comprises a sensor unit (102), a control unit (110), a power supply unit (104), a solar battery (103), a lighting unit (101), an alert panel (106), a warning sound unit (107), a BLE antenna (109), an interface (108), and a memory (105).

The delineator streetlight (100) is installed in a regular interval on the median or guardrail of roads and each is assigned an unique ID.

The sensor unit (102) detects a vehicle on the road or a wild animal on and, nearby, off the road and outputs a detection signal to the control unit (110).

The sensor unit (102) may be made of an illuminance sensor (102a) and an infrared sensor (102b). The illuminance sensor (102a) detects the degree of brightness (illuminance) near the delineator streetlight (100) and outputs to the control unit (110), and the control unit (110) detects day and night and the vehicle based on the detected degree of brightness.

For example, the control unit (110) detects that there is a vehicle on the road when the illuminance value suddenly increases due to the illumination of the vehicle while the illuminance value remains constantly low at night.

The infrared sensor (102b) detects the movement of a wild animal at a distance from the infrared radiation reflected from a wild animal (or human) within the detection range of the sensor and outputs to the control unit (110)

Although, in the above, an illuminance sensor is used as a sensor for detecting vehicles and an infrared sensor is used as a sensor for detecting wild animals, other sensors (i.e. speed sensor or motion sensor) may be used for detection as well.

The power supply unit (104) is a device that supplies power required to operate the delineator streetlight (100).

The power supply unit (104) may be made of a battery or a rechargeable battery, and apart from that, it may also be made of a secondary cell battery such as a lead acid battery, an alkali storage battery, a gas battery, a lithium ion battery, a nickel hydrogen battery, a nickel cadmium battery, or a polymer battery.

The power supply unit (104) can be charged by receiving power from the solar battery (103) or by receiving electricity from a commercial power source.

The solar battery (103) is installed facing towards the sun on the top of the delineator streetlight (100).

The solar battery (103) converts solar energy into electrical energy, and supplies electrical power to the power supply unit (104) by processing the electrical energy with a DC/DC converter with a constant voltage.

The present invention is not limited to above. The solar battery (103) can directly supply power to the delineator streetlight (100), and the delineator streetlight (100) can receive power from a cable in the case of a tunnel.

The alert panel (106) is installed toward the opposite direction of traffic, facing the vehicle, consists of multiple LEDs (Light Emitting Diode), and may further include a cover for the multiple LEDs.

The alert panel (106) can be in various sizes and shapes. The cover attaches with the alert panel (106) in various attachment methods and is composed of a material or a color that protects the LEDs from the external environment and improve identification of the alert panel (106).

Further, the LED of the alert panel (106) sequentially or alternately flickers according to the control signal of the control unit (110) after it receives a detection signal from the sensor unit (102).

Further, the alert panel (106) is easily identifiable as it flickers over a certain period by the sensor unit (102), can adjust LED's brightness (illuminance), and can change LED's color emission or adjust LED's color arrangement (i.e. arranging red and yellow LEDs alternately) to be more distinguishable.

The lighting unit (101) is installed towards the road and is composed of multiple of LEDs. The LED is turned on according to the control signal of the control unit (110) after it receives a detection signal from the sensor unit (102).

The LED of the lighting unit (101) is a high-illuminant LED that has a much greater luminance than the LEDs of the alert panels (106).

Further, the alert panel (106) and the lighting unit (101) switch into deactivated mode in absence of signals of the sensor unit (102) and control signals from the control unit (110), which reduces the amount of power consumed and increases the delineator streetlight's (100) efficiency at the same time.

And, all switches between deactivated mode and activated mode of the alert panel (106) and the lighting unit (101) is made by the control unit (110)

The warning sound unit (107) is installed toward the opposite direction of traffic, facing the vehicle, is composed of a speaker or a buzzer, and outputs an announcement or a warning siren that informs of a wild animal ahead over a certain period according to the control signal of the control unit (110)

The interface (108) is connected with nearby delineator streetlights (100) by a cable and performs wired communication.

Further, though nearby delineator streetlights (100) perform wireless communication amongst each other using the antenna (109), the present invention uses the BLE antenna equipped with a low-power Bluetooth (BLE) module inside for the relay transmission of signals between adjacent delineator streetlights (100).

The control unit (110) receives a detection signal from the sensor unit (102) and determines whether the signal indicates a vehicle, a wild animal, or daytime or nighttime.

For example, when driving with a headlight on at night, the illuminance sensor (102a) of the sensor unit (102) detects the degree of brightness (illuminance) and transmits a detection signal to the control unit (110), and the control unit (110) compares the degree of brightness with previous degree of brightness stored in the memory (105) and determines that a vehicle is on the road if the degree of brightness is much greater than the previous degree of brightness.

Further, the infrared sensor (102b) of the sensor unit (102) detects movements of wild animals and transmits a detection signal to the control unit (110), and the control unit (110) determines an appearance of a wild animal if there is a movement of a wild animal.

When determined as an appearance of a wild animal, the control unit (110) transmits a control signal to the alert panel (106) and/or the warning sound unit (107). Based on the control signal, the alert panel (106) outputs an electrical signal of sequentially or alternately flickering LED, or the warning sound unit (107) switches on and outputs an announcement or a warning signal.

Further, when determined as an operation of a vehicle on the road, the control unit (110) outputs a control signal to the lighting unit (101). Based on the control signal, the lighting unit (101) turns on its LED.

Further, the control unit (110) allows the alert panels (106) to flicker or the lighting units (101) to turn on in nearby delineator streetlights (100) by transmitting control signals to nearby delineator streetlights (100) using the interface (108) or the BLE antenna (109).

FIG. 3 is a schematic diagram of the delineator streetlight system according to an embodiment of the present invention.

As shown in FIG. 3, the delineator streetlight (100) is installed in regular intervals (about 20-30 meters) at the same height (low-altitude) as vehicles on the medians or guardrails of Road A along the direction of traffic and each has a unique ID. Multiple delineator streetlights (100) (for example, 255 delineator streetlights) get grouped and form a zone.

Thus, a number of zones are connected along the median or guardrail of the road.

The described delineator streetlight (100) does not operate by itself except for an event caused by a vehicle or a wild animal or status control made by the central control server (3)

On the other hand, the delineator streetlight (100) is equipped with a low-power Bluetooth (BLE) antenna for relay transmission of signals between adjacent delineator streetlights (100), and a beacon signal between the low-power Bluetooth antennas is transmitted from upper (later in order in the direction of traffic) to lower (first in order in the direction of traffic) or from lower to upper based on the type of the control signal.

For example, in the case of the control signal for flickering the alert panel (106) due to an appearance of a wild animal, the beacon signal is relay transmitted from upper to lower. In the case of the control signal for turning on the lighting unit (101) due to a car detection, the beacon signal is relay transmitted from lower to upper.

Further, in case of the appearance of a wild animal on the road, the animal detection signal (beacon signal) can be transmitted to a smartphone (S1) in a nearby vehicle from the BLE antenna (109) of the detected delineator streetlight (100).

Through this, the wild animal appearance information, such as wild animal appearance point (location), time, and the direction of traffic, is collected from the smartphone (S1) and transmitted to the later described central control server (3)

As stated above, while the delineator streetlights (100) communicate via low-power Bluetooth with smartphones (S1, S2) of passengers in a vehicle operating in a lower region of the road, before the wild animal appearance location, the smartphones (S1, S2) inside the operating vehicle receive push notification service about the upper road condition and wild animal appearance information transmitted from the delineator street light (100).

Thus, once a smartphone (S1) receives the beacon signal, the wild animal appearance information is collected and transmitted to the phone communication company (4) through the central control server (3), which processes the collected information, and the phone communication company (4) notifies another smartphone (S2) in another vehicle by sending the processed wild animal appearance information, for instance, via Geofencing, synchronization, or push notification.

At this instance, if a separate dedicated application for display of wild animal appearance is installed on a smartphone (S2), a more detailed wild animal appearance information, such as wild animal appearance point (location), time, and the direction of traffic, is displayed on the smartphone's (S2) screen.

Thus, according to the present invention, the wild animal appearance information can only be accurately delivered to the dedicated applications driving on the same road in the same direction of traffic via communication between delineator streetlight's (100) low-power Bluetooth antenna (109) and smartphones (S1, S2).

Further, by placing a report button on the screen of a smartphone (S1) when the designated application is being used, allow an existing hazard element of a wild animal appearance ahead of traffic to be reported, a report signal to be transmitted to the central control server (3) when the report button is selected, and an alert driving signal to be resent out to a smartphone (S2) of a passenger in the lower region of the road, prior to the appearance location.

On the other hand, among multiple delineator streetlights (100) within the same zone, the first delineator streetlight (upper repeater (100A)) and the last delineator streetlight (lower repeater (100B)) is not only equipped with the low-power Bluetooth antenna (109) but also may be further equipped with an Internet of Things (IoT) communication module (i.e. LTE/M module) for communicating with the central control sever (3).

Contrast to the control signal for flickering the alert panel (106) or the control signal for turning on the lighting unit (101), the status control of delineator streetlights (100) in each zone according to the remote control of the central control server (3) only transmits a remote control signal from the upper repeater (100A) to the lower repeater (100B) within the same zone.

Through this, the upper repeater (100A) controls and manages multiple of delineator streetlights (100) in the same zone.

Further, the lower repeater (100B) performs the function of the upper repeater (100A) of the next zone.

Meanwhile, when the lower repeater (100B) receives the wild animal detection signal via relay transmission between low-power Bluetooth antennas (109), the lower repeater (100B) collects the wild animal appearance information and transmits to the central control server (3) through Internet of Things (IoT) communication module.

By performing Internet of Things communication with the upper and lower repeaters (100A, 100B), the central control server (3) remote controls delineator streetlights (100) or receives the wild animal appearance information.

In addition, the central control server (3) performs customer management, accident management, product management, and road management.

FIG. 4 is a drawing used for explaining the relay lighting of the delineator streetlight system according to an embodiment of the present invention.

When a vehicle (1) drives on a dark road (A) with its headlight on, the illuminance sensor (102a) of the sensor unit (102) on the reflection panel (111) of the delineator streetlight (100) detects the degree of brightness of the car's headlight and transmits a detection signal to the control unit (110), and the control unit (110) compares the degree of brightness with previous degree of brightness stored in the memory (105) and determines that a vehicle is operating on the road.

Accordingly, while the control unit (110) turns on the high-illuminant LED of its lighting unit (101), the control unit (110) transmits a control signal that will turn on the lighting units (101) of the nearby upper delineator streetlights (100) and the unique IDs of the delineator streetlights that will be signaled through the BLE antenna (109). Then, while the control unit (110) of the upper delineator streetlight (100) receives the transmission through the BLE antenna (109) and turns on the high-illuminance LED of its lighting unit (101), the upper delineator streetlight (100), then again, transmits a control signal that will turn on the lighting units (101) of the nearby upper delineator streetlights (100) and the unique IDs of the delineator streetlights that will be signaled through the BLE antenna (109).

Repeating this process among multiple delineator streetlights (100) installed at a regular interval allows safe driving at night as multiple delineator streetlights (100) in front of a vehicle are successively turned on and reduces power consumption as delineator streetlights (100) are successively turned off after the vehicle has passed by.

FIG. 5 is a drawing used for explaining the relay flashing of the delineator streetlight system according to an embodiment of the present invention.

For example, on a winding road, the infrared sensor (102b) of the sensor unit (102) on the reflection panel (111) of a delineator streetlight (100) detects an infrared radiation reflected from a wild animal (2) and outputs to the control unit (110). Based on the output, the control unit (110) determines that a wild animal (2) has appeared on the road.

Accordingly, while the control unit (110) flickers the alert panel's (106) LED, the control unit (110) transmits a control signal that will flicker the alert panels (106) of the nearby lower delineator streetlights (100) and the unique IDs of the delineator streetlights that will be signaled through the BLE antenna (109). Then, while the control unit (110) of the lower delineator streetlight (100) receives the transmission through the BLE antenna (109) and flickers the LED of its alert panel (106), the lower delineator streetlight (100), then again, transmits a control signal that will flicker the LED of its alert panel (106) of the adjacent lower delineator streetlight (100) and the unique ID of the delineator streetlight that will be signaled through the BLE antenna (109).

Repeating this process among multiple delineator streetlights (100) installed at a regular interval allows safe driving at night by alerting the driver in the lower region of the road as multiple delineator streetlights (100) successively flicker in relay towards the lower region of the road.

At this point, multiple LEDs of the alert panel (106) can sequentially or alternately flicker, can adjust the brightness of the LED (luminance) or the rate of flickering per minute (i.e. higher rate of flickering closer to the wild animal appearance location), and can change LED's color emission or adjust LED's color arrangement (i.e. arranging red and yellow LEDs alternately) to be more distinguishable.

FIG. 6 is another exemplary diagram of a delineator streetlight that applies to the present invention.

As illustrated in FIG. 6, the left-handed traffic delineator streetlight (100) has a streetlight body (120) on an upper portion of a pillar (130) that has a certain height, a lighting unit (101) on the roadside of the streetlight body (13), a reflection panel (111) on the opposite-side in the direction of traffic, and a solar battery (103) on the upper side.

The reflection panel (111) serves as a shade to prevent the streetlight to shine on the driver and is equipped with an alert panel (106) that is comprised of multiple LEDS and a sensor unit (102) that detects a car or a wild animal.

Particularly, the reflection panel (111) is protruded in the middle to have two slopped sides, where the illuminance sensor (102a) is located in the middle and the two infrared sensors (102b) are located on each of the slopped sides.

Thus, two infrared sensors (102b) are equipped to each detect wild animals (2) on the road and off the road in nearby area.

Through this, the control unit (110) determines if the wild animal appearance location is on the road or off the road. In the case of the wild animal appearance location to be on the road, the control unit (110) flickers the alert panel (106), for example, in red LEDs, and transmits the control signal for flickering the red LEDs of the alert panels (106) and the wild animal detection signal to nearby lower delineator streetlights (100).

The wild animal detection signal is relayed to the lower repeater (100B) through relay transmission, and the lower repeater (100B) collects the wild animal appearance information and transmits the collected information to the central control server (3) through the Internet of Things (IoT) communication module.

If the wild animal (2) appearance location is off the road, the control unit (110) flickers the alert panel (106), for example, in yellow LEDs, and transmits the control signal for flickering the yellow LEDs of the alert panels (106) to nearby lower delineator streetlights (100).

Then, the wild animal detection signal is not transmitted to the nearby lower delineator streetlights (100).

The invention claimed is:

1. A low-altitude, low-power installable smart streetlight system comprising:
    a plurality of delineator streetlights that are installed in regular intervals at the same height as vehicles on medians or guardrails, that are grouped to form a zone, and that have unique IDs, respectively,
    wherein each of the delineator streetlights comprises:
    a lighting unit on a roadside;
    a reflection panel on an opposite-side of a direction of traffic;
    a low-power Bluetooth antenna, inside of the delineator streetlight, that relays control signals between nearby the delineator streetlights;
    a sensor unit equipped on the reflection panel, and including a first sensor that detects vehicles on roads and outputs a detection signal and a plurality of second sensors that detect a wild animal and output a detection signal;
    an alert panel, equipped on the reflection panel, that is formed in an arrangement of multiple LEDs; and
    a control unit that controls the lighting unit to turn on when a car detection signal is inputted from the sensor unit, that successively transmits the control signal for turning on the lighting unit to nearby the delineator streetlights using the low-power Bluetooth antenna, that controls the alert panel to flash when a wild animal detection signal is inputted from the sensor unit, and that transmits a control signal of flashing the alert panel to nearby the delineator streetlights using the low-power Bluetooth antenna,
    wherein the reflection panel is protruded in the middle to have two slopped sides, and the plurality of second sensors include a second sensor on one of the two slopped sides to detect the wild animal on the road and a second sensor on the other of the two slopped sides to detect the wild animal off the road,
    wherein the multiple LEDs include a caution LED and a warning LED with different colors,
    wherein the control panel flashes the warning LED and transmits the control signal for flashing the warning LED and the wild animal detection signal to nearby delineator streetlights when deciding that the wild animal has been detected on the road, and
    wherein the control panel flashes the caution LED, and transmits the control signal for flashing the caution LED to nearby delineator streetlights when deciding that the wild animal has been detected off the road.

2. The low-altitude, low-power installable smart streetlight system of claim 1,
    wherein the control panel transmits the control signal for turning on the lighting unit and the control signal for flashing the alert panel in different directions in relay.

3. The low-altitude, low-power installable smart streetlight system of claim 1,
    wherein the control panel transmits the wild animal detection signal via push notification to a smartphone of a passenger in a car nearby the location where the wild animal has been detected when it decides that the wild animal has been detected on the road.

4. The low-altitude, low-power installable smart streetlight system of claim 1,
    wherein each of the first delineator streetlight and the last delineator streetlight of the zone in the direction of traffic includes an Internet of Things communication module that receives the control signal from delineator streetlights within the same zone and transmits the wild animal detection signal by Internet of Things communication with a central control server.

5. The low-altitude, low-power installable smart streetlight system of claim 1,
    wherein the reflector panel is formed on the opposite-side of the direction of traffic to prevent a light of the delineator streetlight from shining on drivers of the vehicles.

* * * * *